July 24, 1928.
J. B. CRAVEY ET AL
1,678,586
GASOLINE DISPENSING DEVICE
Filed Nov. 7, 1927
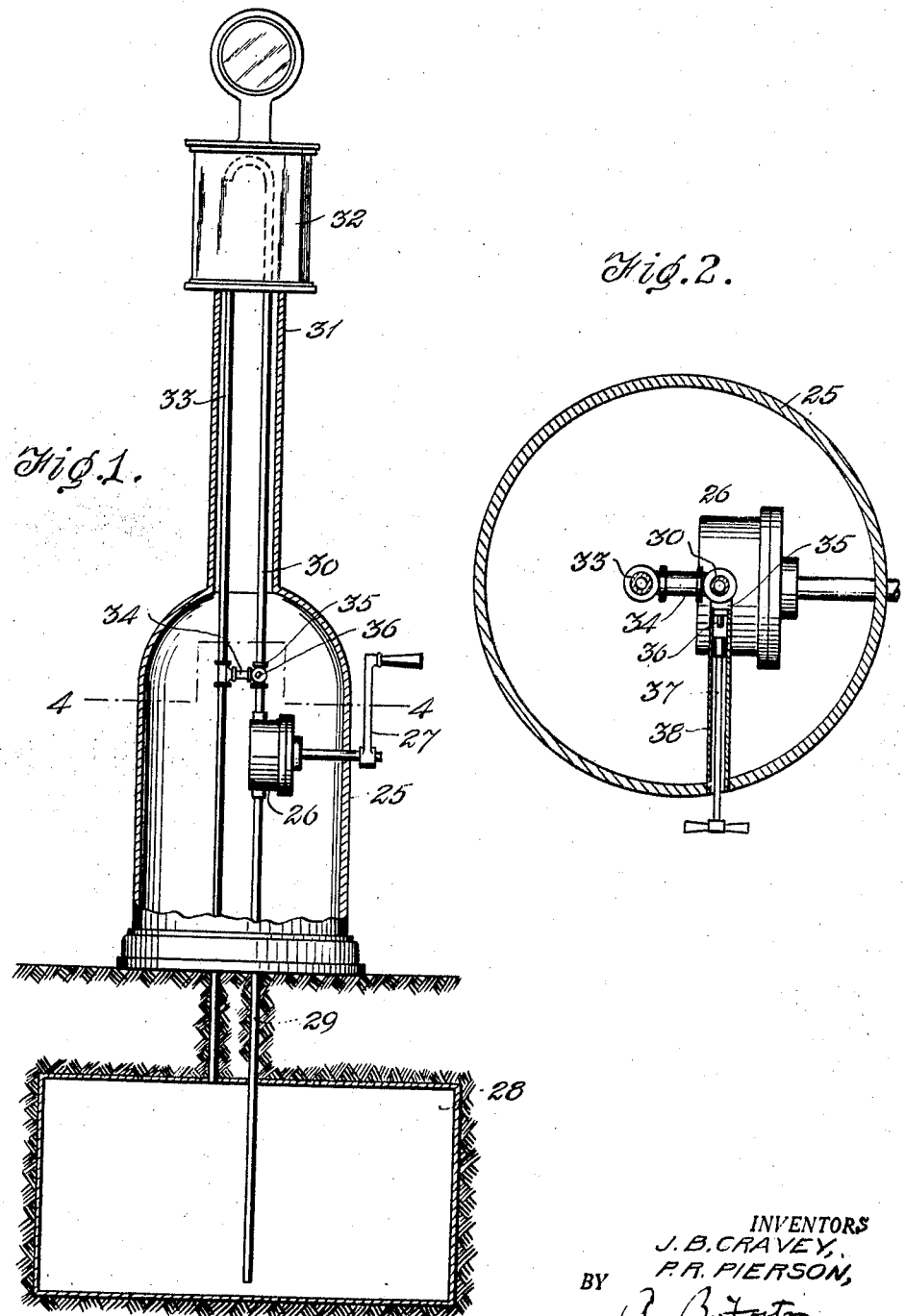
INVENTORS
J. B. CRAVEY,
P. R. PIERSON,
BY
ATTORNEY.

Patented July 24, 1928.

1,678,586

UNITED STATES PATENT OFFICE.

JAMES B. CRAVEY AND PAUL R. PIERSON, OF MONTGOMERY, ALABAMA.

GASOLINE-DISPENSING DEVICE.

Original application filed April 16, 1927, Serial No. 184,389. Divided and this application filed November 7, 1927. Serial No. 231,761.

This invention relates to pumps such as are used for the handling of gasoline, lubricating oils and other petroleum products or in fact any liquids which are usually dispensed by measuring pumps. More particularly the invention relates to a theft preventing device for measuring pumps. This application being a division of our copending application 184,389, filed April 16, 1927, for dispensing device with safety lock.

The principal object of the present invention is to provide, in a device of this character, means whereby any operation of the pump when the device is locked will simply circulate the gasoline without running it up into the measuring tank.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a vertical section showing one embodiment of the invention.

Figure 2 is a detail section on the line 4—4 of Figure 1.

In the present embodiment of the invention there is shown a filling station dispensing device of ordinary form having a base 25 containing a pump 26 which is operated by a handled crank 27. This pump is connected to an underground tank 28 by a pipe 29 and from the pump a pipe 30 extends upward through the hollow port 31 to a visible measuring cylinder 32. At 33 is a return pipe which leads from the cylinder 32 down through the port and base to the tank 28. The pipes 30 and 33 are connected by a by-pass pipe 34 and at the junction of the pipes 30 and 34 is a three way valve 35 which has a stem 36 adapted to be engaged by a socket key or wrench 37 guided into position through a pipe 38 extending from the valve to the base casing.

In this form of the invention it is obvious that in those types of dispensing devices having no return pipe the part of the pipe 33 above the pipe 34 may be omitted.

In the operation of the device the valve is turned at ordinary times to close connection between the pipes 30 and 34 and open connection between the upper and lower parts of pipe 30. When shutting down the dispensing device the valve 35 is turned to open connection between pipes 30 and 34 and close off the upper part of the pipe 30 so that any liquid pumped will be returned to the tank and thus cannot be dispensed.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a dispensing device, a base casing, a pump mounted therein, a tank below said pump, a pipe connected to the suction side of said pump and leading to said tank, a delivery pipe leading from said pump, a branch leading from the delivery pipe back to the tank, and a three way valve at the junction of the delivery pipe and branch, said three way valve being housed entirely within the casing and spaced from the walls thereof and including an operating stem also entirely within and spaced from the walls of the casing, said base casing having an opening therein alined with said stem whereby to permit the insertion of a valve operating tool to engage the stem, and a guide pipe leading from said opening to said valve stem to guide the tool inserted through the opening.

2. In a dispensing device, a base casing, a pump mounted therein, a tank below said pump, a pipe connected to the suction side of said pump and leading to said tank, a delivery pipe leading from said pump, a return pipe leading through the casing to the tank, a branch connecting the return and delivery pipes, and a three way valve at the junction of the delivery pipe and branch, said three way valve being housed entirely within the casing and spaced from the walls thereof and including an operating stem also entirely within and spaced from the walls of the casing, said base casing having an opening therein alined with said stem whereby to permit the insertion of a valve operating tool to engage the stem, and a guide pipe leading from said opening to said valve stem to guide the tool inserted through the opening.

In testimony whereof we affix our signatures.

JAMES B. CRAVEY.
PAUL R. PIERSON.